United States Patent [19]

Patterson

[11] 4,373,978
[45] Feb. 15, 1983

[54] BONDING DEVICES AND METHODS FOR BONDING TAPE CLOSURES TO A CONTAINER END

[75] Inventor: Richard A. Patterson, Woodbury, Minn.

[73] Assignee: Minnesota Mining and Manufacturing Company, St. Paul, Minn.

[21] Appl. No.: 264,832

[22] Filed: May 18, 1981

[51] Int. Cl.³ .............................................. B65D 17/14
[52] U.S. Cl. ........................................ 156/69; 156/212; 156/285; 156/444; 156/475; 156/493; 220/270; 220/359; 428/35
[58] Field of Search ...................... 156/69, 285, 583.3, 156/212, 444, 475, 493; 220/260, 270, 359; 428/140, 35; 53/478, 485, 488, 489, 324, 281; 229/5.7, 43, 62

[56] References Cited

U.S. PATENT DOCUMENTS

| | | |
|---|---|---|
| 2,684,240 | 7/1954 | Lindsey .................................. 226/88 |
| 2,990,081 | 6/1961 | DeNeui et al. ........................ 156/519 |
| 3,389,827 | 6/1968 | Abere et al. ......................... 220/359 |
| 3,472,724 | 10/1969 | Casey .................................... 156/521 |
| 3,750,511 | 8/1973 | Toensing ................................. 83/337 |
| 3,990,603 | 11/1976 | Brochman ............................ 220/260 |
| 4,108,330 | 8/1978 | Patterson ............................. 220/260 |
| 4,135,637 | 1/1979 | Hannula ............................... 220/271 |
| 4,215,791 | 8/1980 | Brochman ...................... 220/260 X |
| 4,256,528 | 3/1981 | Patterson .......................... 414/36 X |
| 4,264,400 | 4/1981 | Breitmar ......................... 156/285 X |

*Primary Examiner*—Caleb Weston
*Assistant Examiner*—Robert A. Dawson
*Attorney, Agent, or Firm*—Cruzan Alexander; Donald M. Sell; W. L. Huebsch

[57] ABSTRACT

A device and method for bonding closure tapes to opposite sides of a container end with one tape having a heat activatabel adhesive. The heat activatable adhesive is applied by a heated substantially planar bonding surface and the second tape having a pressure-sensitive adhesive is applied by compressed air acting against the tape to press the tape to the container end and into the preformed opening against the first tape.

4 Claims, 3 Drawing Figures

BONDING DEVICES AND METHODS FOR BONDING TAPE CLOSURES TO A CONTAINER END

BACKGROUND OF THE INVENTION

This invention relates to methods for pressure bonding adhesive tapes to container ends.

Both pressure-sensitive and heat-activated adhesive tapes have been found useful in closure systems for containing beverages and drinks, e.g., see U.S. Pat. Nos. 3,389,827 (Brochman et al.), 3,990,603 (Brochman), 4,108,330 (Patterson) and 4,135,637 (Hannula). Pressure-sensitive adhesive tapes have generally been applied to container ends using apparatus comprising a vacuum wheel which cuts and applies predetermined lengths of tape to the container end. Non-heated elastomeric pads are then used to press and bond the lengths of pressure sensitive tape onto the container end, e.g., see U.S. Pat. Nos. 2,684,240 (Lindsey), 2,990,081 (De-Neui), 3,472,724 (Casey) and 3,750,511 (Toensing).

Heat activated adhesive tapes (i.e., adhesive tapes comprising thermoplastic adhesives) have generally been applied to preheated container ends using apparatus comprising a vacuum wheel or reciprocating pad and shear which cuts and applies predetermined lengths to the container end. Heated rigid and elastomeric bonding pads are then used to press the previously applied predetermined lengths of tape onto the container end at conditions of time, temperature, and pressure sufficient to cause the thermoplastic adhesive on the tape to melt and bond to the container end.

In many instances, it is advantageous to apply tapes to cover both the interior and exterior surface of the container end adjacent the preformed opening. In these cases, the bonding pads are shaped and are required to deform the tapes into the preformed opening and also to bond the adhesive of the interior tape to the adhesive surface of the exterior tape in the area of the preformed opening. These bonds must be made with minimum entrapment of air both between the tapes and also around the edge of the preformed opening.

Conventional bonding means such as those discussed above often are not suitable for bonding fragile adhesive tapes to container ends. In particular, such methods often result in tearing of fragile tapes when the tapes are deformed over the sharp steel edges circumscribing the preformed opening in the container ends since an excessive amount of force provided by a bonding pad is localized at those edges. Also, conventional bonding methods, as described above, often employ resilient, elastomeric bonding pads adjacent heated platens. Unfortunately, such pads are susceptible to wear and must be replaced frequently. Additionally, shaped elastomeric pads must be aligned very accurately with the preformed opening in the container end to function properly. This accurate alignment is often difficult to achieve and maintain in high speed equipment.

SUMMARY OF THE PRESENT INVENTION

The present invention provides novel devices and methods for bonding predetermined lengths of tape to container ends. More particularly, in the devices and methods of the present invention, compressed air is employed to deform one adhesive tape into the cavity of the preformed opening and to bring it into contact with a second tape in the area of that opening. The second tape which is a heat-activated adhesive tape is bonded to the container end portion by means of a heated platen. Unlike prior art methods, tearing of the first tape is minimized with the devices and methods of the present invention since compressed air exerts a uniform pressure on the first tape and thus deforms it into the preformed opening without causing the tape to tear adjacent the sharp metallic edge circumscribing that opening. Use of compressed air also desirably replaces conventional elastomeric bonding pads which, as discussed above, are subject to wear and when shaped are often difficult to align accurately with respect to the opening.

The device and methods of the present invention may be employed in assembling two tape closure systems comprising two heat-activated adhesive tapes or may be employed in assembling two-tape closure systems comprising a heat-activated adhesive tape and a pressure sensitive adhesive tape. Some of the devices and methods described herein are particularly suitable for assembling the two-tape closure system described in copending application Ser. No. 264,833, filed of even date and commonly assigned, incorporated herein by reference.

DETAILED DESCRIPTION OF THE INVENTION

The invention is described in more detail hereinafter with reference to the accompanying drawings wherein like reference characters refer to the same parts throughout the several views and in which.

Figure 1:
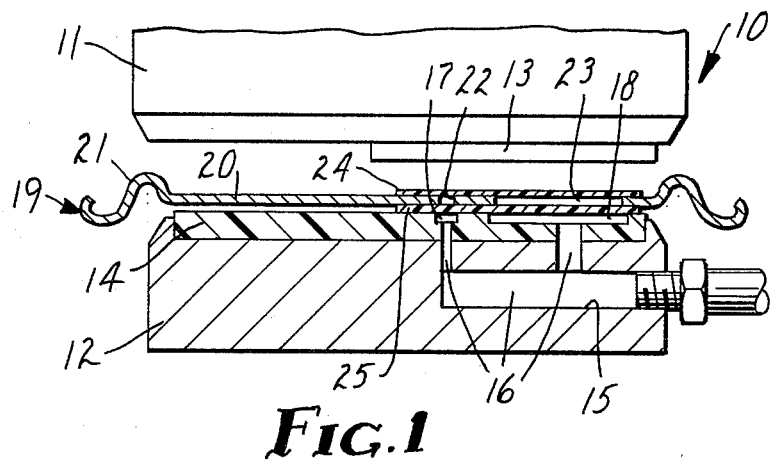
FIG. 1 is a cross-sectional view of one embodiment of a device in accordance with the present invention.

Thus, in FIG. 1 there is illustrated device 10 comprising movable, heated upper platen 11 and stationary lower platen 12. Upper platen 11 includes resilient or rigid bonding pad 13 and lower platen 12 includes elastomeric seal pads 14. Lower platen 12 also includes air channel 15 embedded therein, air channel 15 comprising main port portions 16 and exit ports 17 and 18.

Also illustrated in FIG. 1 is container end portion 19. Container end portion 19 (such as might be seamed onto a cylindrical, metal container body) comprises a generally circular, flat, rigid disc or lid 20 defined by edge 21. Container end portion 19 has therein a vent opening 22 and a preformed opening or pour hole 23 (best illustrated in phantom in FIG. 2). Interior tape 24 and exterior tape 25 are illustrated circumjacent vent opening 22 and pour hole 23.

Figure 2:
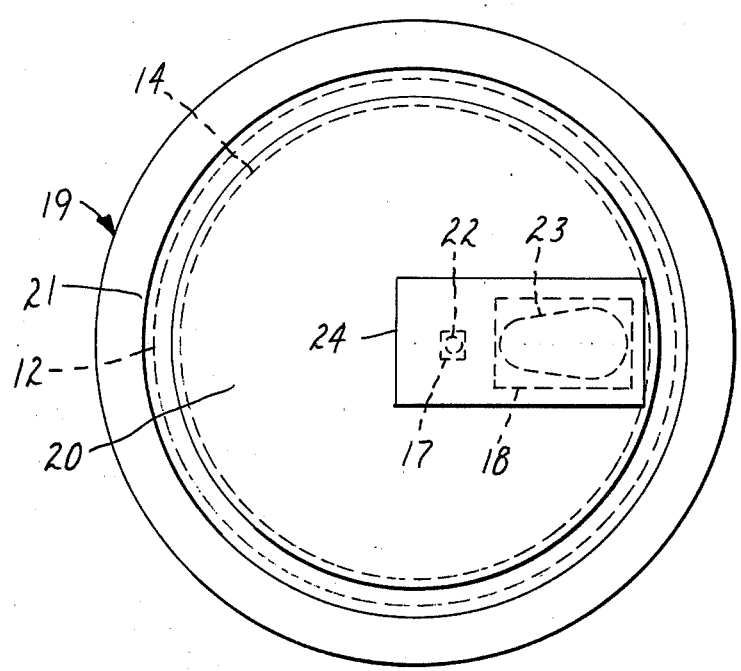
FIG. 2 is a top view of one embodiment of a container end situated within the device of FIG. 1.

Referring now to both FIGS. 1 and 2, the construction of device 10 is more clearly understood. Exit ports 17 and 18 are located such that vent opening 22 and pour hole 23 are adjacent to exit port 17 and exit port 18, respectively, when container end portion 19 is properly aligned within device 10. It is preferred that exit port 17 and exit port 18 be dimensioned such that they each encompass vent opening 22 and pour hole 23, respectively. This assures suitable deformation of exterior tape 25 into vent opening 22 and pour hole 23. Also, bonding pad 13 is preferably dimensioned such that it encompasses interior tape 24. Alignment of these ports and pads with respect to the tape, and pour and vent holes need only be accurate enough to insure that compressed air can be applied and sealed in the pour hole and vent hole areas. In order to avoid entrapment of air beneath and between the tapes, it is preferred that interior tape 24 and exterior tape 25 be initially attached to container end portion 19 by heat bonding the two tapes in distinct, localized areas of each tape with container end portion 19 and not completely around preformed openings. Container end portion 19 is then inserted between movable, heated upper platen 11 and lower platen 12 and is allowed to rest, in its proper orientation, upon seal pads 14. Heated upper platen 11 is then lowered into position such that bonding pad 12 contacts interior tape 24 and exerts sufficient force on container end portion 19 to provide the desired air-tight seal between exterior tape 25 and seal pads 14. As soon as the upper platen is in contact with the lower platen, compressed air is supplied, via air channel 15, to the exposed surfaces of exterior tape 25. The compressed air causes deformation of exterior tape 25 into pour hole 23 and vent opening 22 against heated upper platen 11 and causes that tape to contact and become adhesively bonded to interior tape 24 in those areas. The clamping force of heated upper platen 11 against seal pad 14 also causes heat to be transferred through interior tape 24 thereby melting its adhesive and to container end 19. The heated container end 19 then cause adhesive on exterior tape 25 to melt and bond to container end. After exterior tape 25 and interior tape 24 are bonded to container end portion 19 and to one another, heated upper platen 11 is raised and container end portion 19 is removed from device 10. It has been found that suitable bonds of thermoplastic adhesive tapes typically used on container ends can be made with platen closed dwell times of approximately 2 to 3 seconds, with pad pressures of approximately 100 lbs. per square inch, with compressed air supply pressures of approximately 60 lbs per square inch, and with bonding pad temperatures of approximately 350° F. Other combinations of time, temperature, and pressure may also be employed to produce satisfactory bonds.

Figure 3:
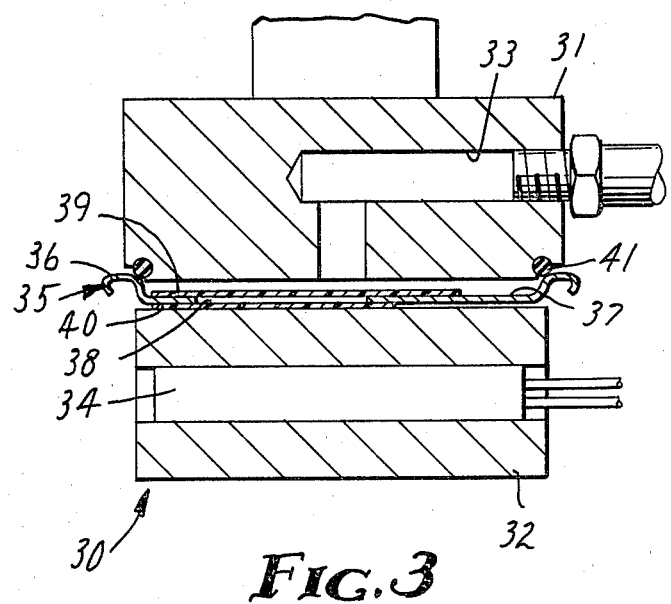
FIG. 3 is a cross-sectional view of another embodiment of a device in accordance with the present invention.

FIG. 3 illustrates another embodiment of a device in accordance with the present invention. Here, device 30 comprises movable upper platen 31 and a heated lower platen 32. Upper platen 31 includes air channel 33 embedded therein and lower platen 32 includes heating elements 34.

Also illustrated in FIG. 3 is a container end portion 35. Container end portion 35 comprises rim 36, lid 37 and pour hole 38 and is shown situated between upper platen 31 and lower platen 32. Exterior tape 39 and interior tape 40 are shown circumjacent pour hole 38. O-ring 41 is provided on upper platen 31 such that when upper platen 31 contacts rim 36 of container end 35, an air-tight seal is provided. Unlike device 10 of FIG. 1, there is no requirement that container end portion 35 be oriented in any particular fashion within device 30.

Device 30 is particularly suitable for bonding an exterior pressure-sensitive tape and a heat-activated interior tape to a container end portion. Such a closure system is described in said copending application Ser. No. 264,833. For such a tape combination, it is not necessary to heat the container end portion prior to initial attachment of the tapes to it. Rather, the exterior and interior tapes may be initially attached to the container end portion through pressure sensitive adhesive attachment of the exterior tape to the container end and to the interior tape through the pour hole. The container end portion with the tapes secured thereto may then be placed within device 30 and the bonding operation may proceed.

In bonding tapes to a container end portion using device 30 of FIG. 3, the procedure is essentially analogous to that employed using device 10 of FIG. 1. The movable, upper platen 31 is lowered onto the container end causing it to be pressed against the heated lower platen 32. An air tight seal is thus formed by the "O" ring 41 on the upper platen and the container end 35. Compressed air is then supplied through channel 33 to the sealed space between the upper platen 31 and container end 35. This pressure forces the exterior tape 39 to be deformed into the pour hole 38 against heated lower platen 32, and to bond to the interior tape 40 in the pour hole area 38. The pressure also pushes the interior tape 40 into contact with the heated lower platen 32 thereby melting the heat activated adhesive on the interior tape and producing a thermoplastic adhesive bond between the interior tape 40 and container end 35. After the bonds have been made between the interior tape 40 and exterior tape 39 and to the container end 35, the movable upper platen 31 is raised and the container end 35 is removed from device 30.

It has been found that suitable bonds of thermoplastic and pressure sensitive tapes typically used on container ends can be made with compressed air supply pressures of approximately 40 lbs. per square inch, platen temperatures of approximately 350° F. and platen closed dwell times of approximately 2 to 3 seconds.

In the practice of the present invention, the tapes are applied initially to the container end prior to insertion of the container end into the devices of the present invention, using conventional means.

Other variants of the present invention will be apparent to those skilled in the art.

I claim:

1. A device for bonding predetermined lengths of tape to a container end having a preformed opening, said device comprising:
   (a) heat-activating first means for adhesively attaching a heat-activated first tape to one side of said container end circumjacent said preformed opening, said heat-activating first means comprising a heated, substantially planar bonding surface; and
   (b) second means for adhesively attaching a second tape to the opposite side of said container end circumjacent said preformed opening, said second means including means for adhesively attaching said second tape to said container end and compressed air means for deforming said second tape into the cavity of said preformed opening such that said second tape contacts and is adhered to said heat-activated first tape in the region of said preformed opening, said compressed air means employing compressed air acting on said container end in a sealed area.

2. A method for bonding predetermined lengths of tape to a container end having a preformed opening, said method comprising:
   (a) adhesively attaching a heat-activated first tape to one side of said container end circumjacent said preformed opening using a heated, substantially planar bonding surface which contacts said heat-activated first tape with said container end; and
   (b) adhesively attaching a second tape to the opposite side of said container end circumjacent said preformed opening, compressed air being employed to deform said second tape into the cavity of said preformed opening such that said second tape contacts and is adhered to said heat-activated first tape in the region of said preformed opening, said compressed air acting on said container end in a sealed area.

3. A method in accordance with claim 2 wherein said second tape is a heat-activated tape.

4. A method in accordance with claim 2 wherein said second tape is a pressure-sensitive tape.

* * * * *